(12) United States Patent
Susnjara et al.

(10) Patent No.: US 12,384,108 B2
(45) Date of Patent: *Aug. 12, 2025

(54) METHODS AND APPARATUS FOR PROCESSING AND DISPENSING MATERIAL DURING ADDITIVE MANUFACTURING

(71) Applicant: Thermwood Corporation, Dale, IN (US)

(72) Inventors: Kenneth J. Susnjara, Birdseye, IN (US); Nicolas Vote, Newburgh, IN (US); Robert Gaesser, Dale, IN (US); Scott G. Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/028,875

(22) Filed: Jan. 17, 2025

(65) Prior Publication Data

US 2025/0162250 A1    May 22, 2025

Related U.S. Application Data

(60) Continuation of application No. 18/795,789, filed on Aug. 6, 2024, which is a continuation of application
(Continued)

(51) Int. Cl.
*B29C 64/209* (2017.01)
*B29C 64/118* (2017.01)
(Continued)

(52) U.S. Cl.
CPC ......... *B29C 64/209* (2017.08); *B29C 64/118* (2017.08); *B29C 64/379* (2017.08);
(Continued)

(58) Field of Classification Search
CPC ......... B33Y 40/00; B33Y 10/00; B33Y 30/00; B29C 64/379; B29C 64/118
See application file for complete search history.

(56) References Cited

U.S. PATENT DOCUMENTS

| 4,209,476 A | 6/1980 | Harris |
|---|---|---|
| 4,721,589 A | 1/1988 | Harris |

(Continued)

FOREIGN PATENT DOCUMENTS

| CA | 3003067 A1 | 4/2020 |
|---|---|---|
| EP | 1208956 B1 | 12/2005 |

(Continued)

OTHER PUBLICATIONS

International Search Report and Written Opinion in corresponding International Application No. PCT/US2017/040188, mailed Sep. 12, 2017 (14 pages).

(Continued)

*Primary Examiner* — Nathan T Leong
(74) *Attorney, Agent, or Firm* — Bookoff McAndrews, PLLC

(57) ABSTRACT

An additive manufacturing method for delivering a flowable material from a nozzle of a programmable computer numeric control (CNC) machine, the nozzle being configured to translate along a first axis, a second axis perpendicular to the first axis, and a third axis orthogonal to the first and second axes. In one embodiment, the method includes actuating an extruder to form a flowable material, delivering the flowable material to a pump, sensing a pressure of the flowable material, and adjusting at least one of a speed of the extruder and a speed of the pump based on at least one of the sensed pressure and a rate of translation of the nozzle along one or more of the first, second, and third axes.

20 Claims, 4 Drawing Sheets

Related U.S. Application Data

No. 18/529,991, filed on Dec. 5, 2023, now Pat. No. 12,083,743, which is a continuation of application No. 18/173,877, filed on Feb. 24, 2023, now Pat. No. 11,872,752, which is a continuation of application No. 17/806,618, filed on Jun. 13, 2022, now Pat. No. 11,607,845, which is a continuation of application No. 17/396,391, filed on Aug. 6, 2021, now Pat. No. 11,383,438, which is a continuation of application No. 16/877,864, filed on May 19, 2020, now Pat. No. 11,104,072, which is a division of application No. 16/455,877, filed on Jun. 28, 2019, now Pat. No. 10,688,719, which is a continuation-in-part of application No. 15/253,290, filed on Aug. 31, 2016, now Pat. No. 10,377,124.

(51) Int. Cl.
   *B29C 64/379* (2017.01)
   *B33Y 40/00* (2020.01)
   *B33Y 10/00* (2015.01)
   *B33Y 30/00* (2015.01)

(52) U.S. Cl.
   CPC ............... *B33Y 40/00* (2014.12); *B33Y 10/00* (2014.12); *B33Y 30/00* (2014.12)

(56) References Cited

U.S. PATENT DOCUMENTS

| | | | |
|---|---|---|---|
| 5,122,315 A | 6/1992 | Darley | |
| 5,605,937 A | 2/1997 | Knaus | |
| 5,695,789 A | 12/1997 | Harris | |
| 7,731,816 B2 | 6/2010 | Oldani et al. | |
| 7,810,539 B2 | 10/2010 | Mischler et al. | |
| 8,151,854 B2 | 4/2012 | Oldani | |
| 8,534,338 B2 | 9/2013 | Oldani et al. | |
| 8,954,180 B2 | 2/2015 | Oldani | |
| 10,377,124 B2 | 8/2019 | Susnjara et al. | |
| 2004/0032040 A1 | 2/2004 | Harris | |
| 2007/0044899 A1 | 3/2007 | Tingley | |
| 2008/0006017 A1 | 1/2008 | Rindels | |
| 2008/0020049 A1 | 1/2008 | Darling et al. | |
| 2010/0200168 A1 | 8/2010 | Oldani et al. | |
| 2012/0070523 A1 | 3/2012 | Swanson et al. | |
| 2012/0080814 A1 | 4/2012 | Sun et al. | |
| 2013/0333798 A1 | 12/2013 | Bosveld et al. | |
| 2015/0035186 A1 | 2/2015 | Teken et al. | |
| 2015/0290875 A1 | 10/2015 | Mark et al. | |
| 2016/0075089 A1* | 3/2016 | Duro Royo | B29C 64/118 425/166 |
| 2016/0263832 A1 | 9/2016 | Bui et al. | |
| 2017/0008230 A1 | 1/2017 | Yuyama | |
| 2018/0050502 A1 | 2/2018 | Oldani | |
| 2018/0056602 A1 | 3/2018 | Susnjara et al. | |
| 2019/0134900 A1 | 5/2019 | Vaal | |

FOREIGN PATENT DOCUMENTS

| | | | | |
|---|---|---|---|---|
| EP | 3112133 A1 | 1/2017 | | |
| WO | WO-2015050958 A2 * | 4/2015 | ........... | B29C 31/042 |
| WO | 2015129733 A1 | 9/2015 | | |
| WO | 2018165761 A1 | 9/2018 | | |

OTHER PUBLICATIONS

International Search Report and Written Opinion in corresponding International Application No. PCT/US2020/038118, mailed Nov. 24, 2020 (18 pages).

Office Action issued in corresponding European Application No. 20735829.2, mailed Jan. 17, 2024.

Sloan, "Big additive machines tackle large molds," Composites World, Jun. 11, 2019 (8 pages).

* cited by examiner

METHODS AND APPARATUS FOR PROCESSING AND DISPENSING MATERIAL DURING ADDITIVE MANUFACTURING

CROSS-REFERENCE TO RELATED APPLICATIONS

This application is a continuation of pending U.S. patent application Ser. No. 18/795,789, filed on Aug. 6, 2024, which is a continuation of U.S. patent application Ser. No. 18/529,991, filed on Dec. 5, 2023, now U.S. Pat. No. 12,083,743, which is a continuation of U.S. patent application Ser. No. 18/173,877, filed on Feb. 24, 2023, now U.S. Pat. No. 11,872,752, which is a continuation of U.S. patent application Ser. No. 17/806,618, filed on Jun. 13, 2022, now U.S. Pat. No. 11,607,845, which is a continuation of U.S. patent application Ser. No. 17/396,391, filed on Aug. 6, 2021, now U.S. Pat. No. 11,383,438, which is a continuation of U.S. patent application Ser. No. 16/877,864, filed on May 19, 2020, now U.S. Pat. No. 11,104,072, which is a divisional of U.S. patent application Ser. No. 16/455,877, filed on Jun. 28, 2019, now U.S. Pat. No. 10,688,719, which is a continuation-in-part of U.S. patent application Ser. No. 15/253,290, filed on Aug. 31, 2016, now U.S. Pat. No. 10,377,124, the entireties of which are incorporated by reference herein.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer-aided design (CAD) model.

A particular type of additive manufacturing is more commonly known as 3D printing. One such process commonly referred to as Fused Deposition Modeling (FDM) comprises a process of melting a very thin layer of a flowable material (e.g., a thermoplastic material), and applying this material in layers to produce a final part. This is commonly accomplished by passing a continuous thin filament of thermoplastic material through a heated nozzle, which melts the thermoplastic material and applies it to the structure being printed. The heated material is applied to the existing structure in thin layers, melting and fusing with the existing material to produce a solid finished product.

The filament used in the aforementioned process is generally produced using an extruder. In some instances, the extruder may include a specially designed screw rotating inside of a barrel. The barrel may be heated. Thermoplastic material in the form of small pellets is introduced into one end of the rotating screw. Friction from the rotating screw, combined with heat from the barrel softens the plastic, which then is forced under pressure through a small opening in a die attached to the front of the extruder barrel. This extrudes a string of material which is cooled and coiled up for use in the 3D printer as the aforementioned filament of thermoplastic material.

Melting a thin filament of material in order to 3D print an item is a slow process, which is generally only suitable for producing relatively small items or limited number of items. As a result, the melted filament approach to 3D printing is too slow for the manufacture of large items or larger number of items. However, 3D printing using molten thermoplastic materials offers many benefits for the manufacture of large items or large numbers of items.

A common method of additive manufacturing, or 3D printing, generally includes forming and extruding a bead of flowable material (e.g., molten thermoplastic), applying the bead of material in a strata of layers to form a facsimile of an article, and machining such facsimile to produce an end product. Such a process is generally achieved by means of an extruder mounted on a computer numeric controlled (CNC) machine with controlled motion along at least the X, Y, and Z-axes. In some cases, the flowable material, such as, e.g., molten thermoplastic material, may be infused with a reinforcing material (e.g., strands of fiber) to enhance the material's strength. The flowable material, while generally hot and pliable, may be deposited upon a substrate (e.g., a mold), pressed down or otherwise flattened to some extent, and leveled to a consistent thickness, preferably by means of a tangentially compensated roller mechanism. The flattening process may aid in fusing a new layer of the flowable material to the previously deposited layer of the flowable material. In some instances, an oscillating plate may be used to flatten the bead of flowable material to a desired thickness, thus effecting fusion to the previously deposited layer of flowable material. The deposition process may be repeated so that each successive layer of flowable material is deposited upon an existing layer to build up and manufacture a desired component structure. When executed properly, the new layer of flowable material may be deposited at a temperature sufficient enough to allow a new layer of such material to melt and fuse with a previously deposited layer, thus producing a solid part.

In the practice of the aforementioned process, a major disadvantage has been encountered. Material extruders, of the type used in near net shape 3D printing, are designed to operate at a constant steady rate in order to produce a steady, consistent homogeneously melted plastic bead. In most cases, however, the majority of heat energy required to melt the plastic is generated by friction from a screw turning inside a barrel. This steady extrusion rate, however, creates difficulties when 3D printing. Specifically, the computer numeric controlled (CNC) machine used to move the extruder-based print head cannot start and stop instantaneously, and must, by necessity, vary in speed as it traces the path required to print the part.

This combination of a machine moving at variable speeds and an extrusion head outputting material at a constant rate results in a print bead that could vary in size. That is, the bead is thicker when the machine head is moving slowly, and thinner when the machine operates at a relatively higher speed.

A common approach employed in addressing the aforementioned problem is to servo-control the extrusion screw, speeding it up when the machine is moving faster and slowing it down as the machine motion slows. Since much of the energy used to melt the plastic is generated by rotation of the screw in the barrel of the extruder, varying the speed not only varies the rate by which material is pumped through the extruder but it also varies the amount of heat energy generated for melting the flowable material, such as, e.g., thermoplastic. The consequential increased temperature results in the thermoplastic material being less viscous; and, therefore, flowing faster than when it is cooler and thereby more viscous. The effect is that the flow rate from the extruder at any point in time is determined not only by the rotational speed of the extrusion screw, but also by the recent history of rotation, which determines how hot and thus how viscous the melted material is. This means that in a system where the rotation speed of an extruder varies randomly with time, the amount of material flowing from an extruder at a specific rotation speed will not be at a constant rate. Therefore, if the extruder screw is servo-controlled to operate at a specific rotational speed for a specific velocity of the print head, the resulting printed bead will not be consistent. Thus, method and apparatus are needed to produce a consistent print bead size when 3D printing.

SUMMARY

Aspects of the present disclosure relate to, among other things, methods and apparatus for fabricating components via additive manufacturing, such as, e.g., 3D printing techniques. Each of the aspects disclosed herein may include one or more of the features described in connection with any of the other disclosed aspects.

In one aspect, the present disclosure is directed to an additive manufacturing method for delivering a flowable material from a nozzle of a programmable computer numeric control (CNC) machine, the nozzle being configured to translate along a first axis, a second axis perpendicular to the first axis, and a third axis orthogonal to the first and second axes. In one embodiment, the method includes actuating an extruder to form a flowable material, delivering the flowable material to a pump, sensing a pressure of the flowable material, and adjusting at least one of a speed of the extruder and a speed of the pump based on at least one of the sensed pressure and a rate of translation of the nozzle along one or more of the first, second, and third axes.

In some embodiments, the method may include one or more of the following features: actuating the extruder includes generating heat to melt material within the extruder; the heat is generated by rotating a screw within a barrel of the extruder; the heat may be generated by at least one heater positioned adjacent the barrel; the heater may be positioned outside of the barrel; the at least one heater may include a plurality of heaters disposed along a length of the barrel; the pressure may be sensed at an inlet of the pump; the flowable material may be a thermoplastic material; and the speed of the extruder and the speed of the pump are based on the sensed pressure and the rate of translation of the nozzle along one or more of the first, second, and third axes.

In another aspect, the present disclosure is directed to a system for additive manufacturing. The system may include a nozzle configured to translate along a first axis, a second axis perpendicular to the first axis, and a third axis orthogonal to the first and second axes, wherein the nozzle is operably coupled to a flowable material delivery assembly. The flowable material delivery assembly may include comprising an extruder including a screw disposed within a barrel; a pump having an inlet and an outlet, wherein the inlet is coupled to the extruder, and the outlet is operably coupled to a conduit in fluid communication with the nozzle; and a pressure sensor configured to sense a pressure of the inlet of the pump, wherein a speed of at least one of the extruder and the pump is based on at least one of a rate of translation of the nozzle and the sensed pressure.

In some embodiments, the method may include one or more of the following features: the extruder may include at least one heater disposed adjacent an outer surface of the barrel; the at least one heater may be a plurality of heaters disposed along a length of the barrel; rotation of the screw within the barrel may be configured to generate heat sufficient to melt thermoplastic material within the barrel; the nozzle may be operably coupled to a programmable computer numeric control (CNC) machine; the speed of the extruder and the speed of the pump are based on the sensed pressure and the rate of translation of the nozzle along one or more of the first, second, and third axes.

As used herein, the terms "comprises," "comprising," or any other variation thereof, are intended to cover a non-exclusive inclusion, such that a process, method, article, or apparatus. The term "exemplary" is used in the sense of "example," rather than "ideal."

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

Figure 1:
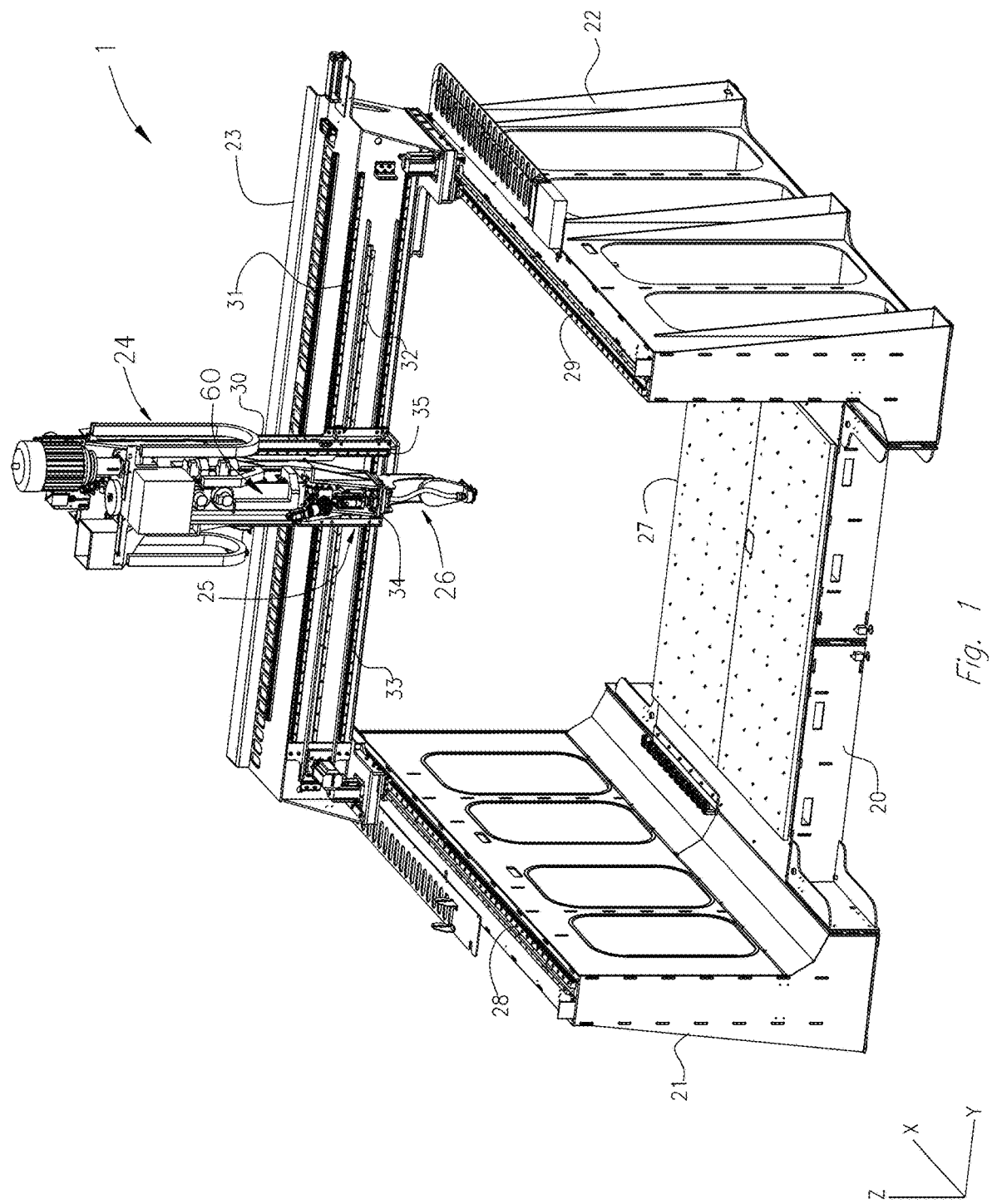
FIG. 1 is a perspective view of an exemplary CNC machine operable pursuant to an additive manufacturing process in the formation articles, according to an aspect of the present disclosure.

The present disclosure is drawn to, among other things, methods and apparatus for fabricating multiple components via additive manufacturing techniques, such as, e.g., 3D printing. More particularly, the methods and apparatus described herein comprise a method for eliminating, or otherwise substantially minimizing variations in the flow-rate of a molten flowable material (e.g., a thermoplastic material) in an additive manufacturing process, by, e.g., providing a servo-controlled fixed-displacement pump (e.g., polymer pump) between the output of an extruder and an application nozzle of a CNC additive manufacturing machine. For purposes of brevity, the methods and apparatus described herein will be discussed in connection with fabricating parts from thermoplastic materials. However, those of ordinary skill in the art will readily recognize that the disclosed apparatus and methods may be used with any flowable material suitable for additive manufacturing, such as, e.g., 3D printing.

In one aspect, the present disclosure is directed to an extruder-based 3D printing head that can deposit melted material (e.g., thermoplastic material) when the print head is traveling at a high rate of speed. In another aspect, the present disclosure is directed to depositing material at a consistent controlled rate at any time regardless of melt temperature variations caused by the history of changes in rotational speed of a screw of the extruder.

In certain sectors of the plastics industry, there are applications in which polymer pumps (also referred to herein as a gear pump) are sometimes utilized, in conjunction with plastic extruders. A polymer pump is a fixed displacement gear pump, which meters a fixed amount of material with each rotation of the pump. Polymer pumps are typically used in operations such as the co-extrusion of two or more materials, where synchronization of the flow rates is critical.

In order for a polymer pump to function properly, the plastic extruder must supply melted material to the input of the polymer pump at a relatively fixed input pressure. The aforementioned method of controlling the rotation of the extruder screw by means of a servo loop (e.g., speeding up the rotation when the pressure drops, or is too low, and slowing down the rotation when the pressure is high) works well in a basic extrusion application because input pressure variations in such a situation are generally slight. As a result, only minor changes to the rotational speed of the extruder screw are necessary to ensure the polymer pump receives melted material at a relatively constant input pressure.

In 3D printing, however, the addition a polymer pump alone to regulate flow-rate does not work satisfactorily. The 3D printing process by nature requires frequent variations in the speed of the print head due to a number of factors. For example, one factor may include speed changes, which are required when applying material in tight arcs or through corners. Speed changes may be necessary when a change in direction of travel for the print head is required. Even with the addition of a polymer pump, variations in the flow rate of such a pump can be dramatic, resulting in servo demands for rapid and substantial changes in extruder rotation speed. A rapid change in extruder screw rotation speed does not immediately translate into a rapid change in flow rate of the melted flowable material. There is a substantial delay between a change in extruder screw speed and a resulting change in flow rate of the melted material. This delay makes the traditional steady state servo approach unworkable when operating with a polymer pump that varies in output rate. For example, if the extruder accelerates quickly, as material is advanced within, the input pressure to the polymer pump will drop, resulting in the servo system quickly increasing the speed of the extruder screw. A delay in the drop in input pressure until after material is moving in the polymer pump, combined with a delay in increased flow rate from the extruder, may allow the input pressure to drop low enough to interrupt a proper flow of material, which results in a deposited bead of inconsistent size and shape.

To address the aforementioned problem, the present disclosure utilizes a modified servo signal approach. Using special algorithms, the control system coordinates the extruder speed with the speed of the polymer pump (gear pump) so that speed increases and/or decreases in both units at the same time. In addition to being simultaneous, the speed changes may be proportional.

With reference now to FIG. 1 of the drawings, there is illustrated a programmable computer numeric control (CNC) machine 1 embodying aspects of the present disclosure. A controller (not shown) may be operatively connected to machine 1 for displacing an application nozzle along a longitudinal line of travel or x-axis, a transverse line of travel or a y-axis, and a vertical line of travel or z-axis, in accordance with a program inputted or loaded into the controller for performing an additive manufacturing process to replicate a desired component. CNC machine 1 may be configured to print or otherwise build 3D parts from digital representations of the 3D parts (e.g., AMF and STL format files) programmed into the controller. For example, in an extrusion-based additive manufacturing system, a 3D part may be printed from a digital representation of the 3D part in a layer-by-layer manner by extruding a flowable material. The flowable material may be extruded through an extrusion tip carried by a print head of the system, and is deposited as a sequence of beads or layers on a substrate in an x-y plane. The extruded flowable material may fuse to previously deposited material, and may solidify upon a drop in temperature. The position of the print head relative to the substrate is then incrementally advanced along a z-axis (perpendicular to the x-y plane), and the process is then repeated to form a 3D part resembling the digital representation.

Machine 1 includes a bed 20 provided with a pair of transversely spaced side walls 21 and 22, a gantry 23 supported on side walls 21 and 22, carriage 24 mounted on gantry 23, a carrier 25 mounted on carriage 24, an extruder 60, and an applicator assembly 26 mounted on carrier 25. Supported on bed 20 between side walls 21 and 22 is a worktable 27 provided with a support surface disposed in an x-y plane, which may be fixed or displaceable along an x-axis. In the displaceable version, the worktable 27 may be displaceable along a set of rails mounted on the bed 20 by means of servomotors and rails 28 and 29 mounted on the bed 20 and operatively connected to the worktable 27. Gantry 23 is disposed along a y-axis, supported at the ends thereof on end walls 21 and 22, either fixedly or displaceably along an x-axis on a set of guide rails 28 and 29 provided on the upper ends of side walls 21 and 22. In the displaceable version, the gantry 23 may be displaceable by a set of servomotors mounted on the gantry 23 and operatively connected to tracks provided on the side walls 21 and 22 of the bed 20. Carriage 24 is supported on gantry 23 and is provided with a support member 30 mounted on and displaceable along one or more guide rails 31, 32 and 33 provided on the gantry 23. Carriage 24 may be displaceable along a y-axis on one or more guide rails 31, 32 and 33 by a servomotor mounted on the gantry 23 and operatively connected to support member 30. Carrier 25 is mounted on a set of spaced, vertically disposed guide rails 34 and 35 supported on the carriage 24 for displacement of the carrier 25 relative to carriage 24 along a z-axis. Carrier 25 may be displaceable along the z-axis by a servomotor mounted on carriage 24 and operatively connected to carrier 25.

Figure 2:
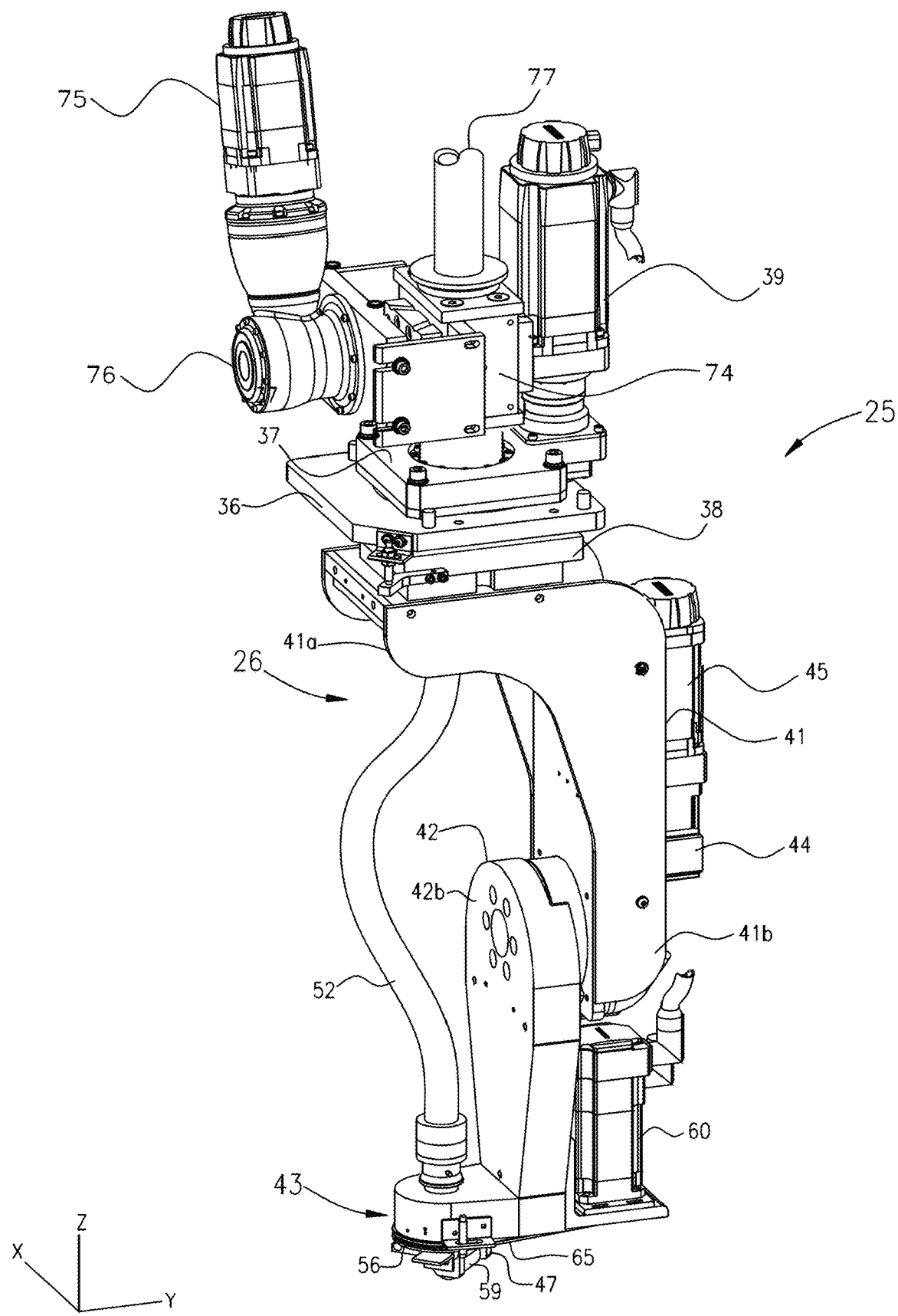
FIG. 2 is an enlarged perspective view of an exemplary carriage and applicator assembly of the exemplary CNC machine shown in FIG. 1.

As best shown in FIG. 2, carrier 25 is provided with a base platform 36, a gear box 37 fixedly mounted on the upper side thereof, and a mounting platform 38 rotatably mounted on the underside of base platform 36. Fixedly mounted to the case of gearbox 37 is a positive displacement gear pump 74, driven by a servomotor 75, through a gearbox 76. Gear pump 74 receives molten plastic from extruder 60, shown in FIG. 1, through an input port 77, shown in FIG. 2. Platform 38 may be provided with openings therethrough disposed along the z-axis of the carrier 25. Gear box 37 may be provided with a gear arrangement having an opening therethrough and disposed coaxially with the aligned openings in gear box 37 and platforms 36 and 38, operatively connected to platform 38 for rotation about the z-axis and rotatable about such axis by means of a servomotor 39 mounted on base platform 36 and operatively connected to such gear arrangement.

Figure 3:
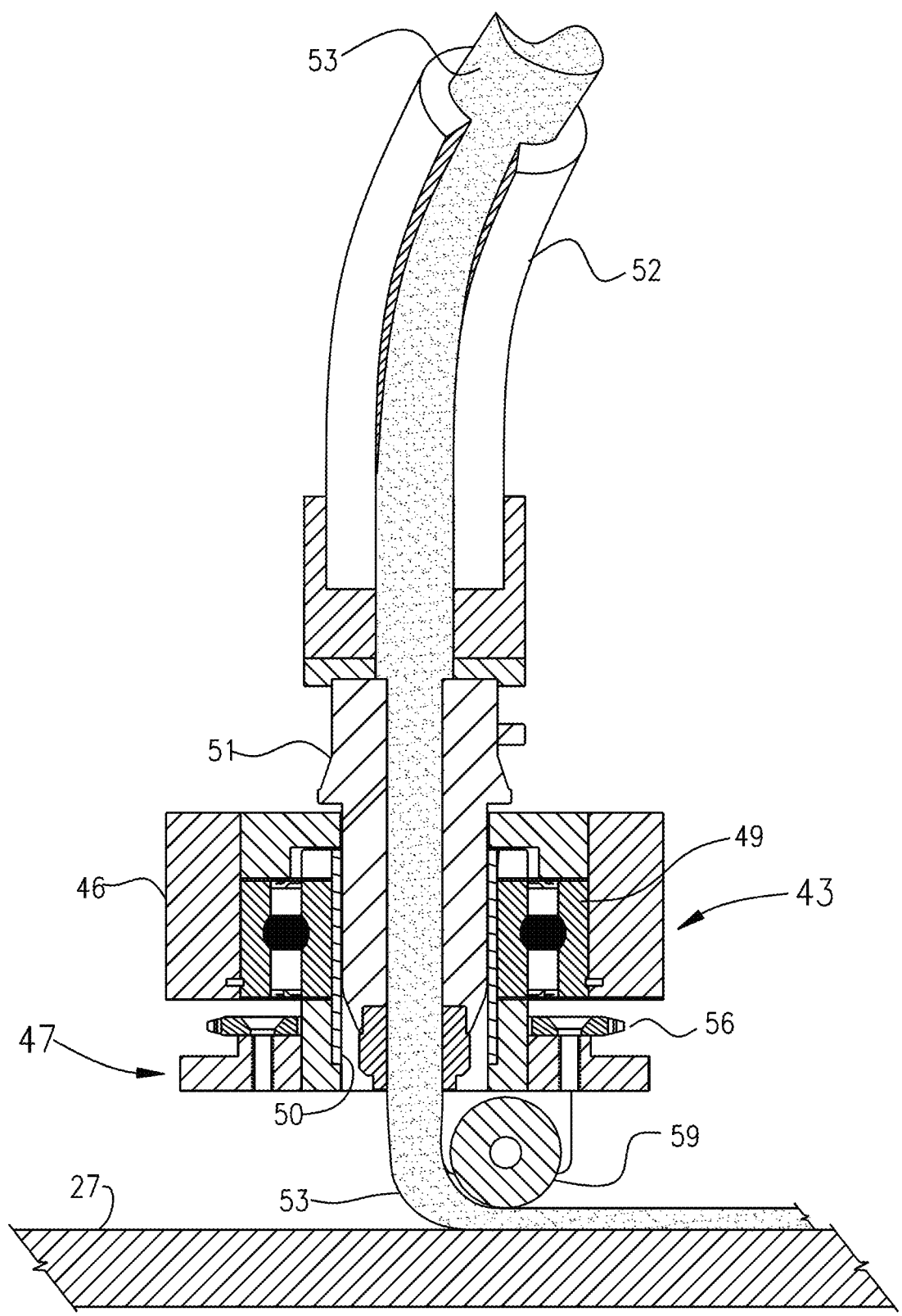
FIG. 3 is an enlarged cross-sectional view of an exemplary applicator head assembly of the exemplary carriage assembly of FIG. 2.

Applicator assembly 26 may include an upper segment 41 and a lower segment 42. Upper segment 41 includes a transverse portion 41a secured to the underside of mounting platform 38 for rotational movement about the z-axis. Upper segment 41 may be provided with an opening therethrough along such z-axis, and a depending portion 41b may be disposed substantially parallel relative to such z-axis. Lower segment 42 includes a housing 42b disposed on an inner side of depending portion 41b. Housing 42b may be mounted on a shaft journalled in a lower end of depending portion 41b, intersecting and disposed perpendicular to the z-axis of carrier 25, and further housing 42b may be provided with a laterally projecting applicator head 43 at a free end thereof. Mounted on a gearbox 44 provided on an outer side of depending portion 41b (opposite housing 42b) is a servomotor 45 operatively connected through gearbox 44 to the shaft journalled in depending portion 41b. Servomotor 45 may be configured for pivotally displacing lower segment 42 in a y-z plane. A material tamping roller 59 (shown in FIG. 3), rotatably mounted in carrier bracket 47, provides a means for flattening and leveling a bead of flowable material (e.g., molten thermoplastic), as shown in FIG. 3. Carrier bracket 47 may be adapted to be rotationally displaced by means of a servomotor 60 (shown in FIG. 2), through a sprocket 56 and drive-chain 65 arrangement.

With continuing reference to FIG. 3, applicator head 43 may include a housing 46 with a roller bearing 49 mounted therein. Carrier bracket 47 is fixedly mounted to an adaptor sleeve 50, journalled in bearing 49. As best shown in FIGS. 2-3, a conduit 52 including an elongated, flexible material for conveying, e.g., a molten bead of a flowable material (e.g., molten thermoplastic) under pressure from a source (e.g., one or more extruder 60 and an associated polymer or gear pump) disposed on carrier 25, to applicator head 43, may be fixedly (or removably) connected to, and in communication with nozzle 51. An intermediate portion of conduit 52 may be routed through the openings through gear box 37, base platform 36 and mounting platform 38, and along the z-axis of carrier 25. In use, the flowable material 53 (e.g., melted thermoplastic) may be heated sufficiently to form a molten bead thereof, which is then forced through conduit 52 and delivered through applicator nozzle 51, to form multiple rows of deposited material 53 in the form of molten beads, as described herein. Such beads of molten material 53 may be flattened, leveled, and/or fused to adjoining layers by any suitable means, such as, e.g., bead-shaping roller 59, to form an article. Even though bead-shaping roller 59 is depicted as being integral with applicator head 43, bead-shaping roller 50 may be separate and discrete from applicator head 43. In some embodiments, the deposited material 53 may be provided with a suitable reinforcing material, such as, e.g., fibers that facilitate and enhance the fusion of adjacent layers of extruded flowable material 53.

In some embodiments, machine 1 may include a velocimetry assembly (or multiple velocimetry assemblies) configured to determine flow rates (e.g., velocities and/or volumetric flow rates) of material 53 being delivered from applicator head 43. The velocimetry assembly preferably transmits signals relating to the determined flow rates to the aforementioned controller coupled to machine 1, which may then utilize the received information to compensate for variations in the material flow rates.

In the course of fabricating a component, pursuant to the methods described herein, the control system of the machine 1, in executing the inputted program, may control the several servomotors described above to displace the gantry 23 along the x-axis, displace the carriage 24 along the y-axis, displace the carrier 25 along a z-axis, pivot lower applicator segment 42 about an axis disposed in an x-y plane and rotate bracket 47 about a z-axis thereof, in accordance with the inputted program, to appropriately deliver material 35 and provide the desired end product or a near duplicate thereof.

Figure 4:
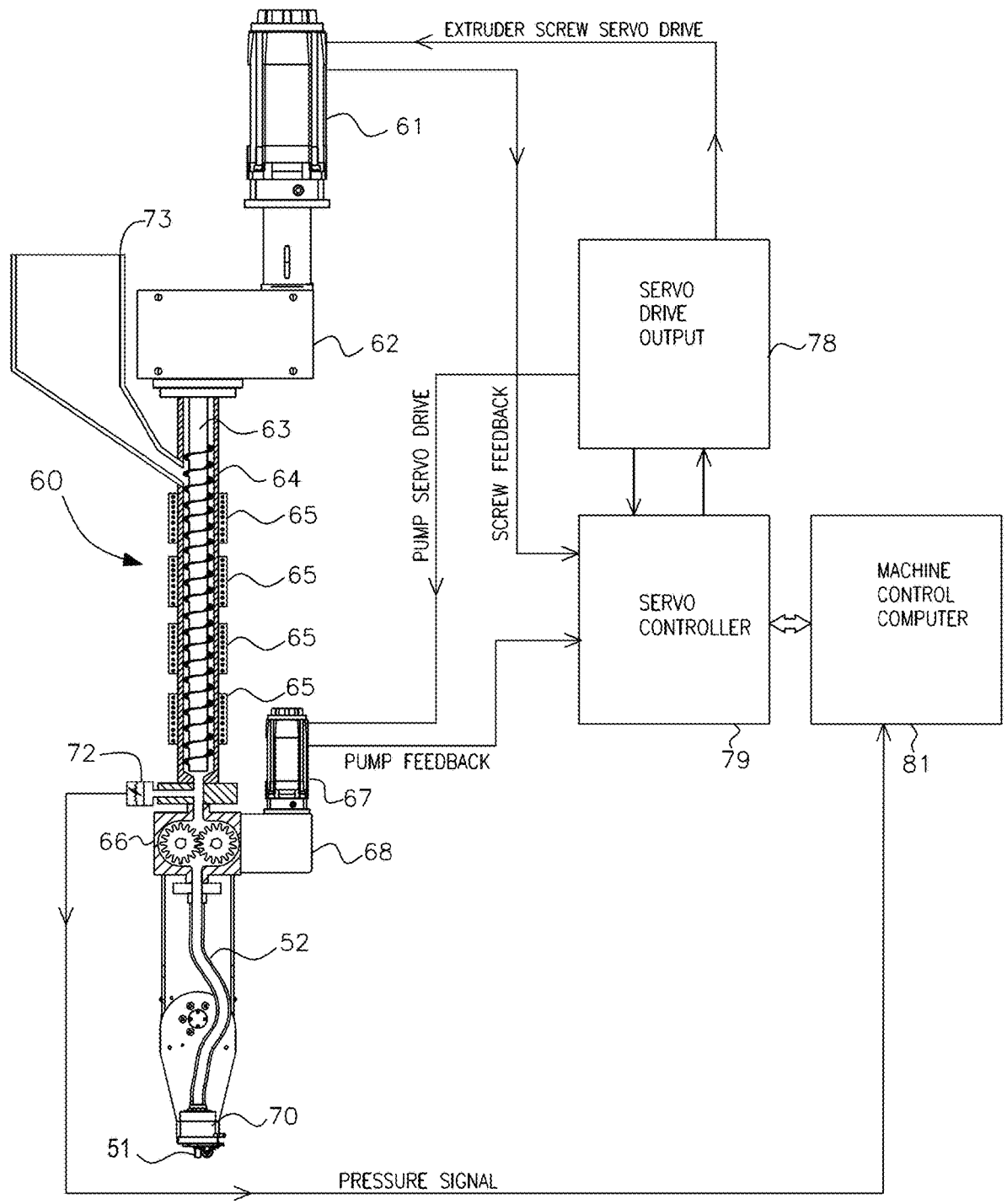
FIG. 4 is a cross-sectional view of a schematic representation of the major mechanical components of an extruder assembly of the present disclosure, along with an exemplary flow diagram of the associated servo signals.

With reference now to FIG. 4, there is illustrated, a cross-sectional schematic representation of a thermoplastic extrusion and application system, along with a block diagram of an exemplary servo control circuit, according to aspects of the present disclosure. FIG. 4 depicts an extruder 60, comprising a heavy duty screw 63, rotatably mounted inside a barrel 64, and driven by a servomotor 61 through a gearbox 62. One or both of the screw 63 and barrel 64 may be made of steel. Pellets of material may be introduced into barrel 64 from a hopper 73. Those of ordinary skill will recognize that the pellets may be of any suitable material. For example, in one embodiment, pellets may be made of thermoplastic material. In addition to pellets, the material may be delivered to hopper 73 in any suitable size or configuration. The pellets introduced into barrel 64 may be heated by the friction generated from the rotation of screw 63 and/or one or more barrel heaters 65 disposed alone a length of barrel 64. Once the pellets have melted, the molten material may be forced under pressure by screw 63, into a servo-controlled gear pump 66, driven by a servomotor 67, through a gearbox 68. Subsequently, the molten material is delivered to conduit 52 for use in 3D printing activities, as described above.

A stable flow rate into conduit 52 and through application nozzle 71 may be regulated by providing servo control of the speed of gear pump 66, through the machine's control computer 81 and servo control system, based on the speed of the CNC machine's moving axes. The speed of extruder screw 63 likewise may be regulated in proportion with the speed of gear pump 66 by a servo control loop. A signal from the gear pump servo loop is processed to control the output of the extruder servo drive in proportion with that of gear pump 66, thus synchronizing the speed of the extruder with that of the gear pump by a predetermined proportion. In other words, the operation speed of gear pump 66 and extruder screw 63 may be dependent on one another. That is, the speed of extruder screw 63 may be determined as a function of the speed of gear pump 66, and vice versa. The speed of extruder screw 63 also may be modified by inputs from one or more sensors 72 (e.g., a pressure sensor or a flow sensor) operably coupled to the extruder.

As the feed rate of the CNC machine changes, representative servo feed-back signals from the moving axes are processed in the machine control computer 81 to control the speed of output pump 66, and correspondingly, the speed of extruder screw 63. Stated differently, machine control computer 81 serves to increase and/or decrease the speeds of extruder screw 63 and gear pump 66 based on increases/decreases in movement of CNC machine 1 during a 3D printing manufacturing process. In embodiments where sensor 72 is a pressure sensor, sensor 72 may monitor the pressure at the inlet of gear pump 66, outputting an analog signal into servo controller 79 and/or machine control computer 81, which in turn, influences the servo loop controlling the extruder screw 63 to bias, adjust, or otherwise fine tune the synchronized speed between extruder screw 63 and gear pump 66, in order to compensate for pressure changes at the inlet of gear pump 66. That is, changes in pressure at the inlet of gear pump 66 may further be used to modify the speeds of extruder screw 63 and/or gear pump 66 and the relative speeds thereof. By coordinating the speed of the gear pump 66 with the speed of the extruder screw 63, while compensating for pressure variations, a constant output proportional to the feed rate of the CNC machine may be achieved at the output of gear pump 66, and through application nozzle 71. With this approach, input pressure is relatively constant because the extruder screw 66 and gear pump 66 change speeds at the same time, with minor adjustments being made to compensate for variables resulting from melt-temperature and pressure variations. Thus, the dimensions of a deposited bead of material remains relatively consistent and dimensionally stable throughout the application process.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the inventions described herein are not to be considered as limited by the foregoing description.

We claim:

1. An additive manufacturing system, comprising:
    a carriage movable along a horizontal direction;
    an extruder including an extruder screw, the extruder being connected to the carriage;
    a plurality of segments, including:
        a first segment connected to the carriage and movable with the carriage; and
        a second segment connected to the first segment;
    a plurality of servomotors for moving the plurality of segments, the plurality of servomotors including:
        a first servomotor configured to cause the second segment to move; and
        a second servomotor configured to cause the carriage to move along the horizontal direction; and
    an applicator assembly connected to and movable with the second segment.

2. The additive manufacturing system of claim 1, further including a nozzle connected to the applicator assembly, the nozzle being movable with the second segment via the first servomotor.

3. The additive manufacturing system of claim 1, further including a rail, the carriage being movable in the horizontal direction and along the rail.

4. The additive manufacturing system of claim 1, further including a movable gantry, the carriage being connected to the gantry.

5. The additive manufacturing system of claim 1, further including a servomotor configured to drive a pump connected downstream of the extruder.

6. The additive manufacturing system of claim 1, further including:
    a pump connected downstream of the extruder;
    a third servomotor configured to drive the pump; and
    a pressure sensor configured to measure a pressure at a location downstream of the extruder.

7. The additive manufacturing system of claim 1, further including an applicator downstream of the extruder and downstream of a pump in communication with the extruder, the applicator carrying a nozzle for depositing material supplied from the pump.

8. The additive manufacturing system of claim 1, wherein the first servomotor is configured to move the applicator assembly in a vertical direction and in the horizontal direction.

9. The additive manufacturing system of claim 1, wherein the first servomotor is configured to move the second segment with respect to the first segment.

10. The additive manufacturing system of claim 1, further including a gear pump, a speed of the gear pump being adjusted based on a rate of translation of the applicator assembly.

11. The additive manufacturing system of claim 1, further including a gear pump, a speed of operation of the gear pump being adjustable at the same time that a speed of the extruder is adjusted.

12. The additive manufacturing system of claim 1, further including a gear pump and a pressure sensor connected upstream of the gear pump.

13. An additive manufacturing system, comprising:
    a carriage movable in a first horizontal direction;
    a plurality of segments connected to the carriage;
    an extruder connected to the carriage and configured to receive pellets of thermoplastic material, the extruder including a rotatable extruder screw; and
    an applicator assembly connected to the plurality of segments, the applicator assembly being fluidly connected downstream of the extruder, the applicator assembly being movable in a second horizontal direction, in a vertical direction, and with the carriage in the first horizontal direction, the applicator assembly configured to place a nozzle of the additive manufacturing system at an angle with respect to the vertical direction.

14. The additive manufacturing system of claim 13, wherein the first horizontal direction and the second horizontal direction are different directions.

15. The additive manufacturing system of claim 13, further including a gantry, the gantry being moveable with the carriage in the second horizontal direction.

16. The additive manufacturing system of claim 13, further including a rail, the carriage being slidably connected to the rail for movement in the first horizontal direction.

17. The additive manufacturing system of claim 13, further including a gantry, the gantry being movably connected to at least one support.

18. The additive manufacturing system of claim 13, further including a gantry, the gantry being movable with the carriage, the plurality of segments, the extruder, and the applicator assembly in the second horizontal direction.

19. The additive manufacturing system of claim 13, further including a melt pump fluidly connected downstream of the extruder and upstream of the applicator assembly.

20. The additive manufacturing system of claim 13, further including:
    a melt pump; and
    a control system configured to adjust a speed of operation of the melt pump and a speed of operation of the extruder.

* * * * *